United States Patent [19]

Treatch

[11] Patent Number: 4,802,235

[45] Date of Patent: Jan. 31, 1989

[54] SUBSCRIBER UNIT FOR A FLEXIBLE COMMUNICATION SYSTEM

[75] Inventor: James E. Treatch, Scottsdale, Ariz.

[73] Assignee: Comven, Inc., Phoenix, Ariz.

[21] Appl. No.: 727,898

[22] Filed: Apr. 26, 1985

[51] Int. Cl.$^4$ .......................... H04B 1/40; H03L 7/00
[52] U.S. Cl. ........................................ 455/76; 455/77; 331/18
[58] Field of Search ................ 455/76, 77, 33, 53, 455/54, 57; 331/18, 25

[56] References Cited

U.S. PATENT DOCUMENTS

| | | | |
|---|---|---|---|
| 2,380,288 | 7/1945 | Bligh et al. | 455/76 |
| 3,155,907 | 11/1964 | Wulfsberg et al. | 455/76 |
| 3,710,274 | 1/1973 | Basse et al. | 331/18 |
| 4,061,973 | 12/1977 | Reimers et al. | 455/76 |
| 4,354,164 | 10/1982 | Gupta | 331/25 |
| 4,399,555 | 8/1983 | MacDonald et al. | 455/76 |

FOREIGN PATENT DOCUMENTS 0068742  5/1980  Japan .................................... 331/18

OTHER PUBLICATIONS

Giles T. G., "Versatile LSI Frequency Synthesizer System, " p. 93, Saunders, "A New Twist to Source Looking," 9/77, FIG. 2.

Primary Examiner—Robert L. Griffin
Assistant Examiner—Curtis Kuntz
Attorney, Agent, or Firm—Harry M. Weiss

[57] ABSTRACT

A communication transceiver is described which can permit operation of the transceiver unit in either the trunked dispatch mode or in the cellular mode. The ability to utilize two sets of frequencies with different transmitter channel separation can be accomplished by providing a phase lock loop configuration with a signal having a frequency that is the separation between the transmit channels of the selected communication system or is a fraction thereof. Similarly, a controllable reference oscillator frequency is forced through the phase locked loop configuration, to provide a signal for which a the frequency multiple of the difference frequency for the selected communication mode and is the frequency of the channel. A scaling network provides a signal for the phase lock loop that, for the correct frequency of a controllable oscillator, is the difference between the transmitter or receiver channels. The feedback loop is used to control the controllable oscillator frequency so that the reference frequency establishes the channel difference frequencies for the voltage controlled oscillator. Apparatus is described for retrofitting existing devices to use the two frequencies or for providing a general frequency synthesizing network to accommodate both modes of communication in response to appropriate logic signals.

14 Claims, 2 Drawing Sheets

SUBSCRIBER UNIT FOR A FLEXIBLE COMMUNICATION SYSTEM

BACKGROUND OF THE INVENTION

1. Field of the Invention

This invention relates generally to communication systems and, more particularly, to a subscriber, or transceiver, unit that can be used in the cellular system and that can also be used with the wide area dispatch system, or in a system that is a combination of these systems.

2. Discussion of the Related Art

In the field of commercially available, portable communication systems, such as can easily be transported in the motor vehicle, at the present time several systems are in use for permitting the transfer of information from one subscriber to a second subscriber. The first system is the cellular system in which a plurality of local transmit/receive installations communicate with a multiplicity of local subscriber units. In this system, to communicate with another participant in the system or to be coupled to an independent communication system, such as the telephone system, the subscriber communication signals are received by the local antenna, transferred to a central unit for processing and appropriate action taken to contact the desired receiving unit. For example, if the target receiving subscriber unit is in a vehicle in a local area serviced by a different transmit/receive installation, the central processing or control system will transfer the communication signals to a telecommunications system. The telecommunications system will return the communication signals to the central processing system and the central processing system will transfer the communication signals to the local transmit/receive installation receiving unit in which the target subscriber unit is located, and the local transmit/receive installation will transmit the communication signals to the target subscriber unit. This system permits full duplex operation and has procedures for handing off the subscriber units to a different transmit/receive installation as a vehicle moves to another local area. The federally assigned frequencies include 333 channels for transmission in the frequency range 870.030 MHz through 879.990 MHz and 333 additional channels for transmission in the frequency range of 880.020 MHz through 889.980 MHz with channel separation frequency of 30 KHz. The channels for reception are spaced 45 MHz below the corresponding transmission channel.

In a second system, generally referred to as the wide area or dispatch system, the communication is accomplished directly from subscriber unit to subscriber unit however, under control of a central transmitter. That is, when the transmitting unit desires to communicate with a perspective receiving unit or units, a designated channel is assigned to both the receiving unit and the transmitting unit by the control system associated with the transmit/receive installation, thereby avoiding potential conflicts in the use of the communication channel. The Federally assigned frequencies for the dispatch system include transmission channels in the frequency range 856.0125 MHz through 865.9875 MHz with a 25 KHz channel separation. The channels for reception are 45 MHz below the corresponding transmission channel. A single transmit/receive installation is used to service an entire area as compared to the cellular system in which a plurality of local transmit/receive installation service local regions. The transmit/receive installation receives the signals from an originating subscriber unit and retransmits the signals to the target subscriber unit.

Federal regulations limit the particular service to which each of the assigned channel's designated frequency band can be used. In particular, the cellular system is not permitted to use the dispatch mode i.e. the mode of operation wherein the communication is made from subscriber unit to subscriber unit or to their place of business via direct radio communication. Therefore, a substantial advantage can be found in combining the two systems in that a wider variety of services, customizing the needs of the individual customer to the available services can be offered by the operator of the system. However, a further problem in the use of a communication combining the two communication systems described above is that, not only are different frequencies ranges assigned by federal regulations to each type of service, but the frequency separation between transmit channels is 25 kilocycles for the trunked dispatch wide area system, and is 30 kilocycles for the cellular system. Because the architecture of the subscriber unit for each service is structured on the separation frequency, the two types of units are generally not compatible.

A need has therefore been felt for a communication system employing a transceiver unit that can utilize the channels assigned both to the wide area or dispatch mode communication system and to the channels assigned to the cellular mode communication system.

SUMMARY OF THE INVENTION

It is therefore an object of the present invention to provide an improved communication system.

It is another object of the present invention to provide a communication system in which channels assigned to a trunked dispatch mode communication system and channels assigned to a cellular mode communication system can both be serviced by a single subscriber unit.

It is a more particular object of the present invention to provide a subscriber unit that can operate either in the trunked dispatch mode of operation or in the cellular mode of operation.

It is yet a more particular object of the present invention to provide a transceiver unit for use in a communication system that can utilize both the frequencies assigned to the trunked dispatch mode communication system and frequencies assigned to the cellular mode communication system.

It is another more particular object of the present invention to provide a transceiver unit that can provide the necessary channel frequencies and channel separation frequencies for operation in either the trunked dispatch mode of operation or in the cellular mode of operation.

The aforementioned and other objects are accomplished, according to the present invention, by a transceiver unit that can provide frequencies compatible with both the cellular mode of operation and the trunked dispatch mode of operation. A controllable frequency source can be generated using a phase lock loop technique with either one or two reference frequencies for stablization of the controllable frequency. The determination of the particular output frequency is made by a scaling or dividing unit that compares a fraction of the output frequency of the controllable frequency unit with a fraction of the reference frequency device. The reference frequency can use a single reference frequency device or can use separate two reference frequency devices. The use of two reference frequency devices can be particularly useful for retrofitting commercially available devices in which a single reference frequency already exists. Either the single or plural reference device is constrained to operate in the two allocated frequency ranges with the existing channel separation. A fraction of the output voltage frequency, determined by a scaling network, and a fraction of the reference voltage frequency, determined by the scaling network, is compared in a phase lock loop apparatus to insure that the internally generated frequency signals are accurate.

These and other features of the present invention will be understood upon reading of the following description along with the drawings.

DESCRIPTION OF THE PREFERRED EMBODIMENT

Detailed Description of the Figures

Figure 1:
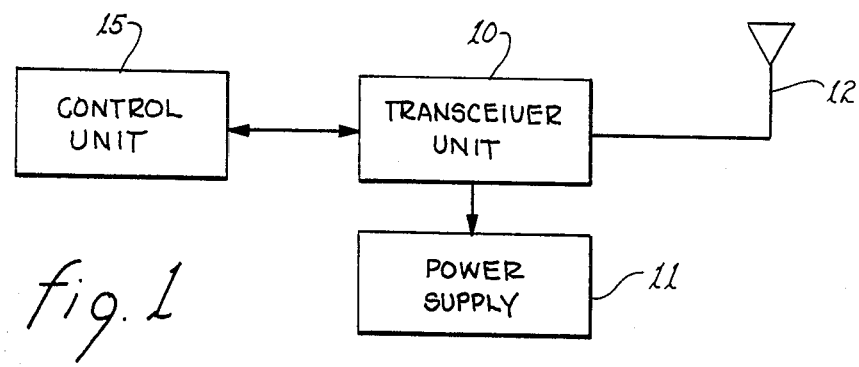
FIG. 1 is a block diagram of a typical communication system using the transceiver of the instant invention.

Referring first to FIG. 1, a control unit 15 is coupled to a transceiver unit 10. The transceiver unit 10 is powered by energy from the power supply 11 and applies and receives signals from an antenna 12. According to one application, the power supply would typically be a motor vehicle battery, while the control unit would typically be a hand held unit similar to a touch phone dialing unit or other interface unit having data entry capacity into which information can be entered and which can be responsive to control and audio-frequency signals.

Figure 2:
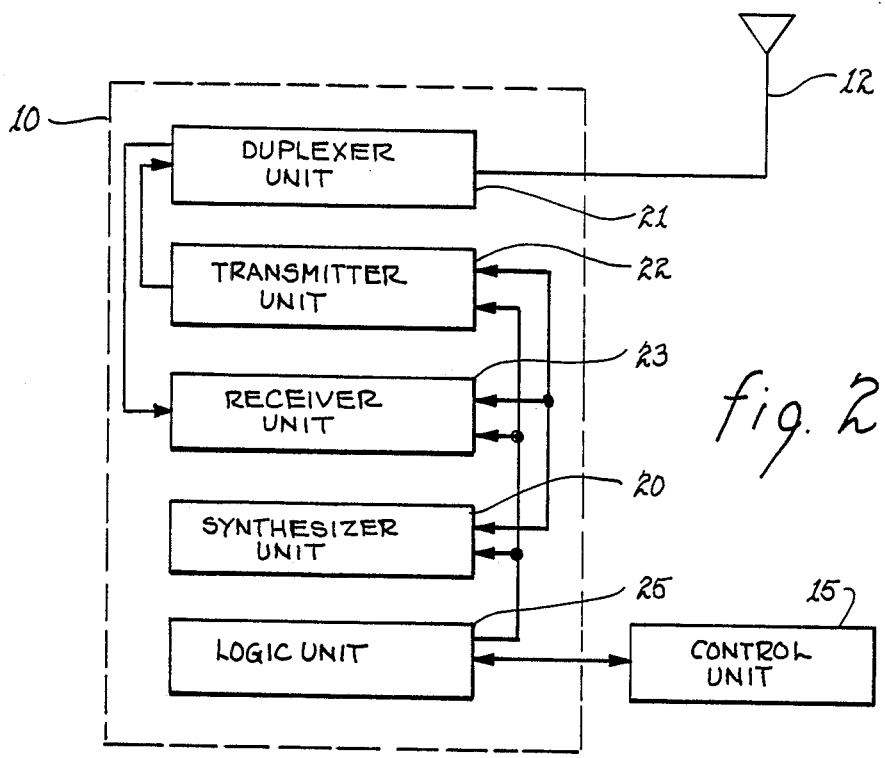
FIG. 2 is a block diagram showing the principle components of a transceiver unit, currently available for use with a cellular system, that can also be used with a dispatch unit.

Referring to FIG. 2, the transceiver unit 10 is shown in more detail. The antenna 12 is coupled to a duplexer unit 21. The duplexer unit 21 receives signals from the transmitter unit 22 and applies signals to receiver unit 23. The logic unit 25 receives and sends signals to the control unit 15 and applies control signals to the synthesizer unit 20, the receiver unit 23 and the transmitter unit 22.

Figure 3:
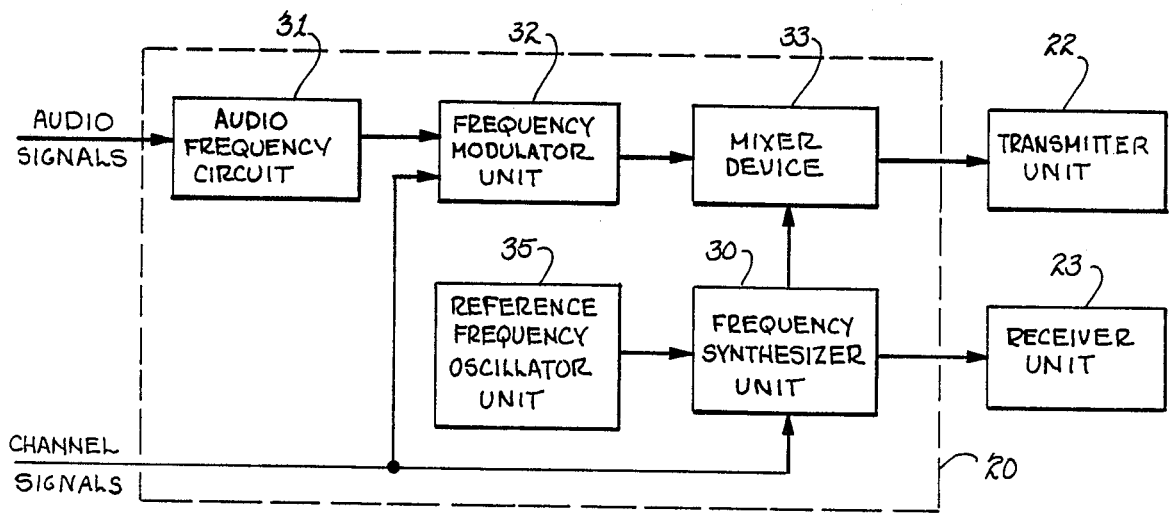
FIG. 3 is a block diagram of a synthesizer unit that is employed in a communication system used with the present invention.

Referring now to FIG. 3, the synthesizer unit 20 of FIG. 2 is shown in more detail. The audio frequency circuit 31 receives audio signals from the logic unit 25 under control of control unit 15. The output signals from the audio frequency circuit 31 are applied to frequency modulator unit 32. The frequency modulator unit 32 applies signals to mixer device 33 and mixer device 33 applies signals to transmitter unit 22. A reference frequency oscillator unit 35 applies signals to frequency synthesizer unit 30 and to frequency modulator unit 32. The frequency synthesizer 30 applies signals to mixer device 33 and to receiver unit 23. Control signals from the logic unit are applied to the frequency modulator 32 and to the frequency synthesizer 30.

Figure 4:
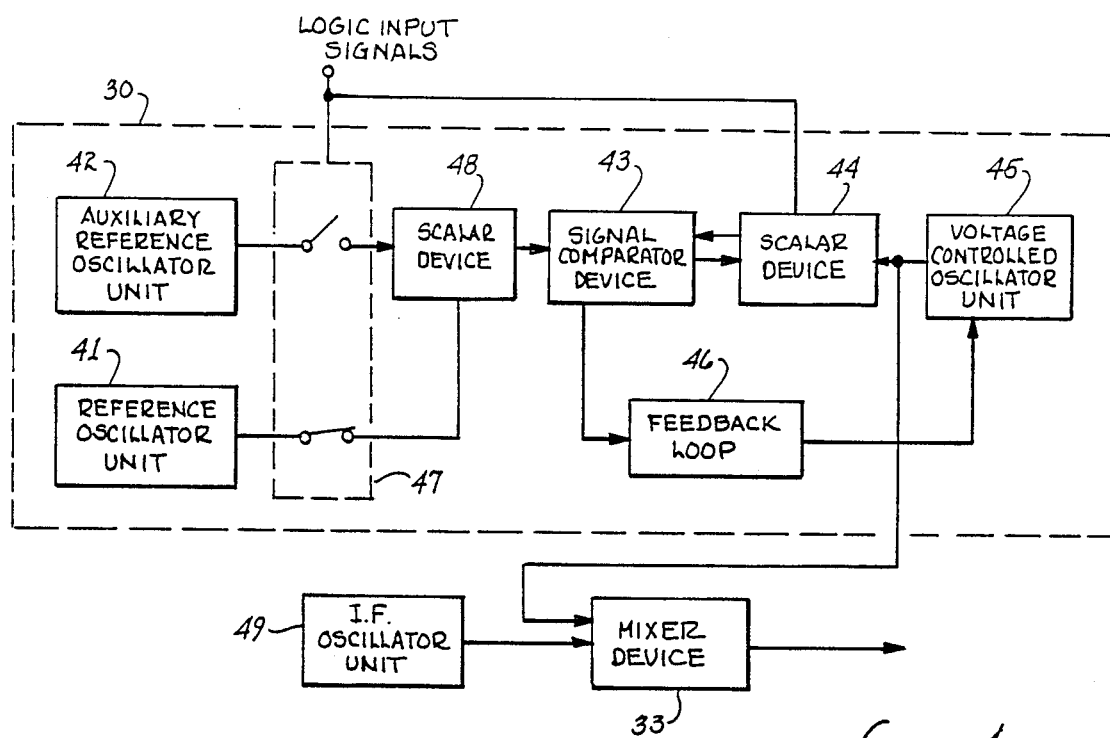
FIG. 4 is a block diagram of the frequency synthesizer unit shown in FIG. 3, modified according to the present invention, to permit communication with both the cellular communication mode and in the trunked dispatch communication mode.

Referring now to FIG. 4, the block diagram of the typical frequency synthesizer unit 30, modified for two modes of communication, is shown. A reference oscillator unit 41 is typically coupled to a scaler device 48 that provides an output signal at a frequency that is a fraction of the frequency of the input signal. A signal comparator device 43 receives signals from the scaler device 48. The scaler device 44 receives logic input signals and receives signals from a voltage controlled oscillator unit 45. The logical signals determine the fraction of the frequency of the input signal that will be the output frequency signal of the scaler device 44. The scaler device 44 provides an output signal having a frequency that is a fraction of the input signal. The output signals from the scaler device 44 are applied to signal comparator device 43 and compared with output signals from scaler device 48. The difference in the two signal frequencies is fed back through feedback loop 46 and consequently controls a frequency of the voltage controlled oscillator unit 45. The method of control is generally known as a phase locked loop control. The output signals from the voltage controlled oscillator unit 45 are also applied to mixer device 33 along with signals from the I.F. oscillator unit 49 where the signals are used in the manner typical of a transceiver unit. In the present invention, a switch 47 can couple reference frequency oscillator unit 41 through scaler device 48 to the voltage comparator device 43 or can couple an auxiliary reference oscillator unit 42 through scaler device 48 to the to voltage comparator device 43. It will be clear that the switch 47 can be either an electronic switch coupling the signals from the reference oscillators or could be a switch that provides power to a selected one of the reference oscillators units.

Figure 5:
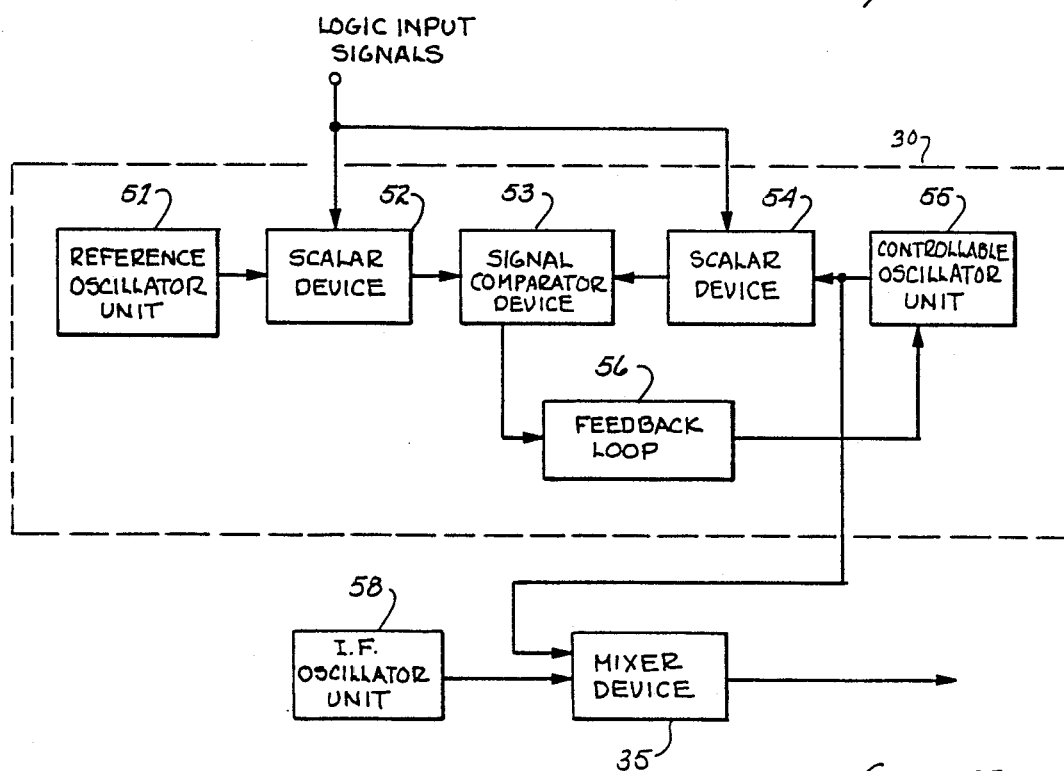
FIG. 5 is a generalized diagram of the apparatus that can be used in both the cellular communication mode and the trunked dispatch communication mode according to the present invention.

Referring next to FIG. 5, a block diagram of the frequency synthesizer 30 using a single reference frequency oscillator unit 51 according to the present invention is shown. Logic signals are applied in this embodiment both to scaler device 52 and scaler device 54. The logic signals control the fraction of the frequency of the input signal to the scaler device that will be the output signal frequency. The reference oscillator frequency 51 is applied through the scaler device to the signal comparator device 53, while the output frequency from controllable oscillator unit 55 is applied through scaler device 54 to signal comparator device 53. The correction or error signal, after comparison of the scaled reference oscillator frequency and the scaled controllable oscillator frequency is applied to the controllable oscillator unit 55 through feedback loop 56 and corrects the output signal frequency of the controllable oscillator by the phase locked loop technique. The signal from the controllable oscillator unit 55 is applied to mixer device 33 along with signals from I.F. oscillator unit 58.

Operation of the Preferred Embodiment

In order for the subscriber unit to operate in both the dispatch mode and the cellular mode, it is necessary that the frequencies and the frequency separations be controllable by the logic units of the transceiver. In the present invention, two methods of achieving this goal are described.

The commerical technique for developing the frequencies required by the transceiver unit for communication modes can generally be described in the following manner. Referring to FIG. 4, a reference oscillator unit 41 signal frequency is counted, divided or scaled to a frequency that is typically the receive transmit channel signal separation frequency or a predetermined fraction thereof. Similarly, the frequency that is to be the output signal frequency is counted, divided or scaled by a programmable logic signal group number scaler device 44 and the two signals, the fraction of the reference oscillator unit signal frequency and the fraction of the voltage controlled oscillator unit signal frequencies are compared in the signal comparator device 43. By means of a feedback loop 46, the voltage controlling the signal frequency of the voltage controlled oscillator unit is adjusted so that the output frequency is a predetermined multiple of the separation frequency.

Referring again to FIG. 4, the scaling device 48 for the reference oscillator unit 41 is also used for the auxiliary reference oscillator unit 42. The second oscillator unit 42 is chosen to provide the defined second separation frequency for voltage controlled oscillator unit 45. In the meantime, the scaler device 44 has appropriate logic signals applied thereto to achieve the multiple of the separation frequency in the voltage controlled oscillator unit 45. Therefore, by the use of the two oscillators, the two channel separations can be accommodated with a minimal amount of additional apparatus. The only apparatus required is the switch 47 that can control which reference oscillator is currently active and can provide the appropriate logic signals to the prescaler to determine the correct separation frequency from the voltage controlled oscillator unit 45. It will be clear to those skilled in the art that switch 47 can be adapted so that scaler device 48 is included with the reference oscillator units and furthermore each scaler device can have a different divisor associated therewith. Similarly, when the reference oscillator has a selected value, the switch 47 can be used to insert scaler devices 48 having different values between the reference oscillator unit 41 and the signal comparison device. By way of example, a commercially available unit has a 7.68 MHz reference oscillator and divisor in scaler 48 of 512 to achieve a comparator frequency of 15.0 KHz. The divisor value of 63482 in scaler 44 provides a channel #1 value of 952.230 MHz for a cellular system. To obtain the subscriber unit transmission signal frequency of 825.030 MHz, the I.F. oscillator frequency signal of 127.2 MHz is mixed with the voltage controlled oscillator frequency signal of 952.230 MHz. By using an auxiliary reference oscillator frequency of 6.4 MHz with the same 512 divisor in scaler 48, a 12.5 KHz signal comparator frequency is achieved and when a divisor of 75855 is placed in scaler 44, a channel #1 frequency of 948.1875 MHz for a dispatch mode is obtained. To obtain the subscriber unit transmission frequency of 820.9875, the I.F. oscillator frequency of 127.2 MHz is combined with the voltage controlled oscillator frequency of 948.1875. It will be clear to those skilled in the art of the design of transmit/receive units, the I.F. frequency is typically chosen as a combination of the tuned frequency of the I.F. amplifier (i.e. 82.2 MHz) and the separation frequency (i.e. 45 MHz) between the transmission and reception frequencies.

Referring to FIG. 5, another embodiment for performing the same function, while maintaining the general architecture of the typical communication system, is shown. The controllable oscillator 55 provides the output signal to mixer device 33. The output signal of controllable oscillator 55 is applied to scaler device 54 which provides a signal with a controllable fraction of the frequency of the output for application to the phase lock loop comparator device 53. Simultaneously, a reference oscillator unit 51 applies a signal to a second controllable scaler device 52. The controllable scaler device 52 permits the defined separation frequency signal or fraction thereof to be applied to the signal comparator device 53 and to be used as a reference frequency signal. The output signal from the signal comparator device 53 is a difference or error signal between the selected reference oscillator signal frequency and the scaled controllable oscillator signal frequency and is used with a feedback loop 56, to adjust the output signal of controllable oscillator unit 55. By way of example, a reference oscillator unit 51 having a frequency of 18.750 MHz can be divided by 1250 to provide a 15 KHz frequency signal or by 1500 to provide a 12.5 KHz frequency signal to signal comparator unit 53. Appropriate values are entered in scaler device 54 to obtain appropriate channel frequency signal (i.e. output signal of the controllable oscillator).

The above description is included to illustrate the operation of the preferred embodiment and is not meant to limit the scope of the invention. The scope of the invention is to be limited only by the following claims. From the foregoing description, many variations will be apparent to one skilled in the art that would yet be encompassed by the spirit and scope of the invention.

What is claimed is:

1. A mobile transmit/receive unit for a communication system comprising:
    first oscillating means for providing a mixer within a mobile transmit/receive unit with signal frequencies compatible with a first set of channel frequencies, said first set of channel frequencies having a first channel separation frequency between adjacent channels and a first transmit/receive separation frequency separating the transmit frequency from the receive frequency;
    second oscillating means for providing said mixer within said mobile transmit/receive unit with signal frequencies compatible with a second set of frequencies, said second set of frequencies having a second separation frequency between adjacent channels, said second channel separation frequency being different than said first channel separation frequency and a second transmit/receive separation frequency separating the transmit frequency from the receive frequency;
    controllable oscillator signal means; and
    comparison means for comparing a selected fraction of an output signal frequency of said controllable oscillator signal means with a preselected fraction of said first oscillator means signal frequency, a difference between said two frequencies controlling said controllable oscillator means output signal, said comparison means and said controllable oscillator signal means forming part of a phase-locked loop.

2. The mobile transmit unit for a communication system of claim 2, wherein said first oscillating means signal frequencies are established by a first reference frequency and wherein said second oscillating means signal frequencies are established by a second reference frequency.

3. The mobile transmit/receive unit for a communication system of claim 1, wherein said first oscillating means signal frequencies are established by a reference oscillator and a means for dividing an output frequency of said reference oscillator by a first integer; and wherein said second oscillator means signal frequencies are established by said reference oscillator and a means for dividing said output frequency of said reference oscillator by a second integer.

4. The mobile transmit/receive unit for a communication system of claim 3 wherein
said first set of frequencies comprises frequencies in the range of 825.030 megahertz through 844.980 megahertz and frequencies in the range of 870.030 megahertz through 889.980 megahertz, and
said second set of frequencies comprises frequencies in the range of 806.0125 megahertz through 820.9875 megahertz and frequencies in the range of 851.0125 megahertz through 865.9875 megahertz.

5. The mobile transmit/receive unit for a communication system of claim 3 wherein said first channel separation frequency is 30 KHz and said second channel separation frequency is 25 Khz.

6. The mobile transmit/receive unit for a communication system of claim 1 wherein said selected fraction is determined by signals received from a central transmit/receive unit.

7. The mobile transmit/receive unit for a communication system of claim 6 wherein said selected fraction activates a pre-determined channel.

8. Communication system mobile transmit/receive unit for use with a first set of frequencies having a first separating frequency for separation between adjacent channels and for use with a second set of frequencies having a second channel separation frequency for separation between adjacent channels comprising:
controllable signal frequency means;
first signal means for providing a signal having a frequency related to a first channel separation frequency;
second signal means for providing a signal having a frequency related to a second channel separation frequency, said second channel separation frequency being different from said first channel separation frequency, said first channel separation frequency not being an integral multiple of said second channel separation frequency and said second channel separation frequency not being an integral multiple of said first channel separation frequency;
selecting means for selecting one of said first and second signal means;
scaling means coupled to said controllable signal frequency means for providing a signal that is a controllable fraction of an output signal frequency of said controllable signal frequency means; and
comparison means for comparing output signals of said scaling means and said selecting means, said comparison means providing an output signal controlling a frequency of said controllable signal frequency means output signal, and said scaling and comparison means forming part of a phase-locked loop.

9. The communication system mobile transmit/receive unit of claim 8 wherein said first signal means includes an oscillator means with a first scaler unit coupled thereto; a said second signal means includes said oscillator means with a second scaler unit coupled thereto.

10. The communication mobile transmit/receive unit of claim 9 wherein said selecting means and said scaling means are responsive to signals to be received by said communication system mobile transmit/receive unit.

11. The communication mobile transmit/receive unit of claim 9 wherein said controllable fraction is related to a separation frequency of a one of said set of frequencies determined by said selecting means.

12. The method of providing a communication unit responsive to federally regulated cellular frequencies and federally regulated trunked specialized mobile radio frequencies comprising the steps of:
providing a group of frequencies which comprises a first set of frequencies with a first channel separation frequency and a second set of frequencies with a second channel separation frequency, said second channel separation frequency being different than said first channel separation frequency, said first channel separation frequency not being an integral multiple of said second channel separation frequency and said second channel separation frequency not being an integral multiple of said first channel separation frequency;
providing a first reference signal that has a frequency that is a fraction of said first channel separation frequency;
providing a second reference signal that has a frequency that is a fraction of said second channel separation frequency;
selecting one of said group of frequencies;
selecting one of said first reference signal and said second reference signal, said selection of one of said first reference signal and said second reference signal being predetermined by the result of said step of selecting said one of said group of frequencies;
scaling a frequency of an output signal from a controllable oscillator by a preselected amount;
comparing said reference signal with said output signal; and
using a different signal from said comparing step to control said output signal frequency.

13. The method of providing a communication unit of claim 12 further comprising the step of:
controlling said scaling step by signals from a central control unit system.

14. The method of providing a communication unit of claim 12 further comprising the step of:
controlling said selecting step by signals from a central control system.

* * * * *

UNITED STATES PATENT AND TRADEMARK OFFICE
CERTIFICATE OF CORRECTION

PATENT NO. : 4,802,235
DATED : Jan. 31, 1989
INVENTOR(S) : James E. Treatch It is certified that error appears in the above-identified patent and that said Letters Patent is hereby corrected as shown below:

In Column 6, Claim 2, line 67, please change "claim 2," to --claim 1,--.

Signed and Sealed this

Fourth Day of July, 1989

Attest:

DONALD J. QUIGG

Attesting Officer

Commissioner of Patents and Trademarks